United States Patent
Cless et al.

(10) Patent No.: US 6,974,634 B2
(45) Date of Patent: Dec. 13, 2005

(54) METAL FELT LAMINATES

(75) Inventors: Craig Cless, Belleville, MI (US); Gregory Corda, Lake Orion, MI (US)

(73) Assignee: Material Sciences Corporation, Elk Grove Village, IL (US)

( * ) Notice: Subject to any disclaimer, the term of this patent is extended or adjusted under 35 U.S.C. 154(b) by 0 days.

(21) Appl. No.: 10/701,068

(22) Filed: Nov. 5, 2003

(65) Prior Publication Data

US 2005/0095446 A1 May 5, 2005

(51) Int. Cl.⁷ .......................... B32B 1/08; B32B 15/14
(52) U.S. Cl. ................... 428/608; 138/149; 138/163; 29/419.1; 29/439; 29/521
(58) Field of Search ................ 428/608, 605, 428/920, 36.91, 582, 598; 138/149, 168, 163; 29/890.037, 890.08, 419.1, 439, 521

(56) References Cited

U.S. PATENT DOCUMENTS

| | | | | |
|---|---|---|---|---|
| 1,576,223 A | * | 3/1926 | Robbins | 15/230.15 |
| 2,197,916 A | * | 4/1940 | Balfe | 428/608 |
| 3,224,622 A | * | 12/1965 | Kordyban et al. | 220/560.13 |
| 3,390,750 A | * | 7/1968 | Albertson | 192/107 M |
| 3,948,295 A | * | 4/1976 | Lemont et al. | 138/147 |
| 4,399,840 A | * | 8/1983 | Lee | 138/168 |
| 4,735,260 A | * | 4/1988 | Wohrl et al. | 165/69 |
| 4,838,235 A | * | 6/1989 | Kawamura et al. | 123/668 |
| 5,020,481 A | * | 6/1991 | Nelson | 122/494 |
| 5,550,338 A | * | 8/1996 | Hielscher | 181/290 |
| 6,166,326 A | * | 12/2000 | Nakajima | 174/36 |
| 6,465,110 B1 | * | 10/2002 | Boss et al. | 428/608 |

* cited by examiner

Primary Examiner—John J. Zimmerman
(74) Attorney, Agent, or Firm—Berenato, White & Stavish, LLC

(57) ABSTRACT

A finished laminate is provided. The laminate includes an imperforate metal layer having a metallic surface, and a metallic felt layer having a first surface attached to the metallic surface and an exposed second surface facing away from the metallic surface. Also provided is multi-layer tubing including a thermally conductive metal layer having a metallic surface, and a substantially thermally non-conductive, metallic felt layer having an outer felt layer surface attached to the metallic surface and an exposed inner felt layer surface. The metal layer and the metallic felt layer collectively form a laminate configured as a substantially cylindrical structure with the metallic felt layer positioned radially inward of the metal layer. In certain embodiments, the metal the laminate has opposite side edge portions overlapping and coupled to one another at a coupling portion, without a thermally conductive path through the coupling portion.

51 Claims, 9 Drawing Sheets

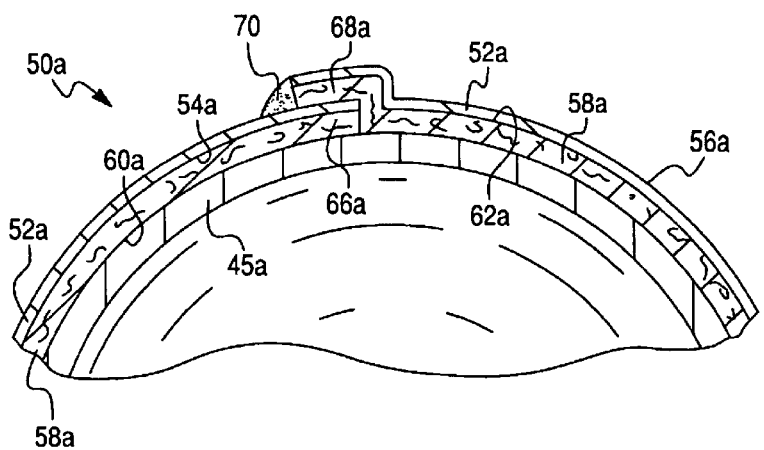
Fig. 7
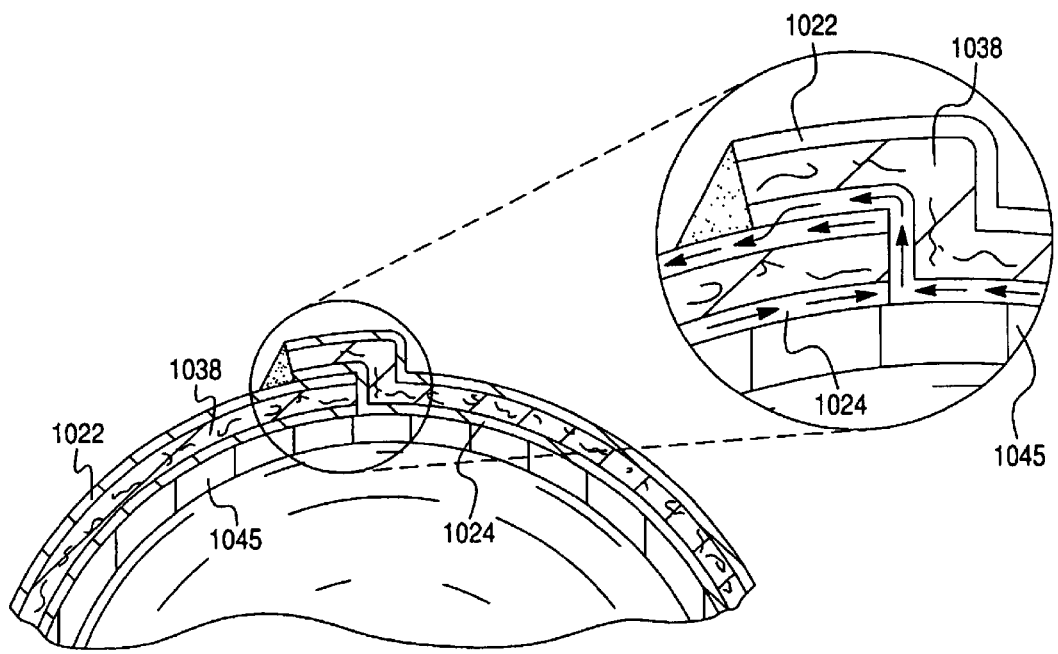
Fig. 13B
Fig. 13A

METAL FELT LAMINATES

BACKGROUND OF THE INVENTION

1. Field of the Invention

This invention relates to laminates, and more particularly, to laminates having thermal insulation and optionally vibration damping properties, and to assemblies and structures incorporating the laminates.

2. Description of the Related Art

Laminates comprising outer and inner metal skin layers with an interposed insulation material have been used to provide thermal insulation and vibration and noise control in a variety of applications. The insulation material typically has been selected from ceramic, glass cloth, and asbestos.

Many of the laminates having this conventional construction suffered because the insulation layers were not weldable to the skins or the entire laminates were not weldable to other structures. These drawbacks limit the flexibility of the use of the laminates with other structures and the ability to form the laminates into finished products, such as tubing. The insulation layer selected for the laminates also did not have structural integrity, further limiting the usefulness of the laminates.

Many of these problems have been largely overcome by U.S. Pat. No. 6,465,110 to Boss et al., the disclosure of which is incorporated herein by reference, the assignee of which is the assignee hereof, which discloses in certain embodiments a laminate having vibration damping and thermal insulation properties. An embodiment of a laminate disclosed in Boss has been reproduced herein and is designated by reference numeral 1020 in FIGS. 11 and 12. The laminate 1020 comprises a first imperforate metal layer 1022 having an interior surface 1026 and an exterior surface 1030, and a second imperforate metal layer 1024 having an interior surface 1028 and an exterior surface 1032. A first adhesive layer 1034 is formed on the interior surface 1026 of the first imperforate metal layer 1022. A second adhesive layer 1036 is formed on the interior surface 1028 of the second imperforate metal layer 1024. Sandwiched between the metal layers 1022 and 1024 and attached to the adhesive layers 1034 and 1036 is a metallic felt layer 1038.

The laminate 1020 is shapeable into a substantially cylindrical structure by rolling the laminate 100 to bring its opposite side edge portions into end-to-end abutting relationship. One drawback of forming the laminate 1020 into a cylindrical structure is the degree of precision involved in placing the side edge portions in abutting relationship while controlling the inner and outer diameters of the resulting cylindrical structure. This drawback of precisely fitting the laminate edge portions in end-to-end abutting relationship may be largely overcome by placing the side edge portions in overlapping relationship with one another. FIGS. 13A and 13B illustrate the laminate 1020 (without optional adhesive layers 1034 and 1036) as the laminate 1020 might appear if shaped around a cylindrical pipe 1045 to bring the opposite side edge portions of the laminate 1020 into overlapping relationship. However, the arrangement of the opposite side edge portions in overlapping relationship may adversely impact the ability of the tubular laminate 1020 to function as a thermal barrier between the cylindrical exhaust pipe 1045, which carries hot exhaust gases, and the outside environment. The thermal insulating properties of the laminate 1020 are derived primarily from the metallic felt layer 1038. The first and second metal layers 1022 and 1024, on the other hand, are relatively thermally conductive compared to the metallic felt layer 1038. Overlapping the opposite side edge portions allows the inner second metal layer 1024 to physically contact and thermally communicate with the outer first metal layer 1022. As represented by the arrows in FIG. 13B, the contacting metal layers 1022 and 1024 form a thermally conductive metallic path leading from the cylindrical pipe 1045 to the outside environment. As a consequence, thermal energy is permitted to pass from the inner second metal layer 1024, which is heated by the adjacent exhaust pipe 1045, to the outer first metal layer 1022 at the overlapping region, thereby elevating the temperature of the outer first metal layer 1022 and permitting the escape of heat past the metallic felt layer 1038.

SUMMARY OF THE INVENTION

It is an object of the present invention to provide an improved laminate which avoids the disadvantages of known laminates while affording additional structural and operational advantages.

It is another object of the invention to provide a laminate that is of a relatively simple and economical construction.

Still another object of the invention is the provision of a laminate that is lightweight and provides vibration and noise damping properties and acts as a thermal insulator.

A further object of the invention is to provide a laminate comprising layers that can be welded together and welded to another structure.

Yet another object of the invention is the provision of a thermally insulated assembly including an insulated structure and an insulator formed of the laminate.

Another object of the invention is the provision of tubing formed of the laminate, which may be used, for example, in various automotive and other applications.

Still another feature of the invention is the provision of a laminate that may be arranged in a cylindrical structure with overlapping edge portions, which is free of a thermally conductive metallic path extending from the interior to the exterior of the cylindrical structure.

To achieve one or more yet not necessarily all of the foregoing objects, and in accordance with the purposes of the invention as embodied and broadly described in this document, according to a first aspect of this invention a finished laminate is provided, comprising an imperforate layer having a metallic surface, and a metallic felt layer having a first surface attached to the metallic surface and an exposed second surface facing away from the metallic surface.

According to a second aspect of the invention, a multi-layer tubing is provided. In an embodiment, the multi-layer tubing comprises a thermally conductive metal layer having a metallic surface, and a substantially thermally non-conductive, metallic felt layer having an outer felt layer surface attached to the metallic surface and an exposed inner felt layer surface. The metal layer and the metallic felt layer collectively form a laminate configured as a substantially cylindrical structure with the metallic felt layer positioned radially inward of the metal layer.

A third aspect of the invention provides a multi-layer tubing, comprising a thermally conductive metal layer having a metallic surface, and a substantially thermally non-conductive, metallic felt layer having an outer felt layer surface attached to the metallic surface and an inner felt layer surface. The metal layer and the metallic felt layer collectively form a laminate having opposite side edge portions overlapping and coupled to one another at a coupling portion to configure the laminate as a substantially cylindrical structure with the metallic felt layer positioned radially inward of the metal layer. The laminate is free of a thermally conductive metal path through the coupling portion.

According to a fourth aspect of the invention, a thermally insulated assembly comprising a thermally conductive structure and a multi-layer tubing is provided. The multi-layer tubing comprises a thermally conductive metal layer and a substantially thermally non-conductive, metallic felt layer. The metallic felt layer has an inner felt layer surface surrounding the thermally conducting structure and an outer felt layer surface surrounded by and attached to an inner surface of the metal layer. The metal layer and the metallic felt layer collectively form a laminate having opposite side edge portions overlapping and coupled to one another at a coupling portion to configure the laminate as a substantially cylindrical structure with the metallic felt layer positioned radially between the metal layer and the thermally conductive structure.

According to a fifth embodiment of the invention, a method is provided for thermally insulating a thermally conductive structure. The method of this aspect comprises providing a laminate comprising a thermally conductive metal layer, a substantially thermally non-conductive, metallic felt layer, and opposite side edge portions. The metallic felt layer has an outer felt layer surface attached to the metal layer and an exposed inner felt layer surface. The laminate is arranged around the thermally conductive structure. The opposite edge portions are preferably yet optionally overlapped and coupled to one another at a coupling portion to configure the laminate as a substantially cylindrical structure with the metallic felt layer positioned radially between the metal layer and the thermally conductive structure.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIG. 7 is an enlarged, fragmentary, sectional view taken similar to that of FIG. 6, showing an exhaust pipe surrounded by a multi-layer tubing of another embodiment of the present invention, in which the tubing comprises a laminate having overlapping and welded side edge portions;

FIG. 13A is an enlarged, fragmentary, sectional view showing a multi-layer tubing of an embodiment of the Boss patent configured to surround an exhaust pipe, the multi-layer tubing having opposite side edge portions overlapping and welded in the manner of FIG. 7;

FIG. 13B is an enlarged view of a coupling portion of the multi-layer tubing of FIG. 13A;

Figure 1:
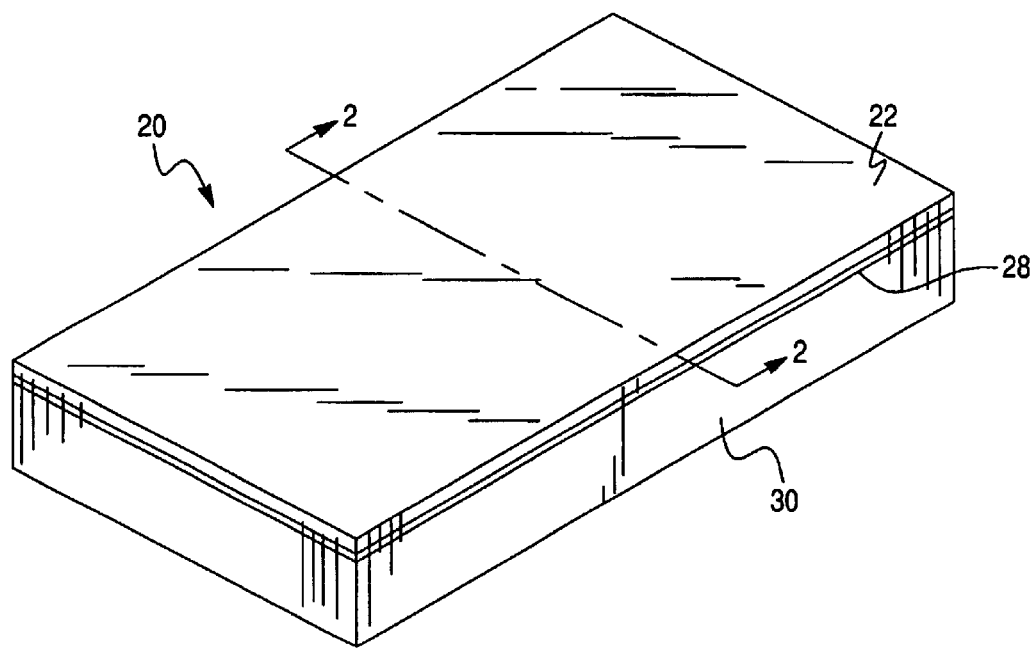
FIG. 1 is a perspective view of a laminate of an embodiment of the present invention.

DETAILED DESCRIPTION OF PREFERRED EMBODIMENTS AND PREFERRED METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

Figure 2:
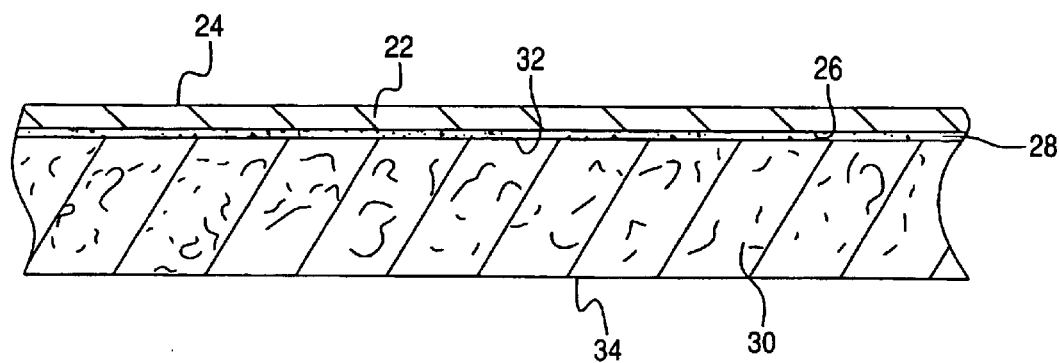
FIG. 2 is an enlarged, fragmentary sectional view taken generally along the line 2—2 of FIG. 1.

Referring to FIGS. 1 and 2, a laminate 20 of an embodiment of the present invention is shown. The laminate 20 includes a metal layer 22 having a first surface 24 and a second surface 26. Preferably but optionally, the metal layer 22 is imperforate and surfaces 24 and 26 are continuous and parallel to one another. The second surface 26 has an adhesive layer 28 disposed thereon. Disposed on the adhesive layer 28 is a metallic felt layer 30. The metallic felt layer 30 has a first surface 32 contacting the adhesive layer 28 and an exposed second surface 34 facing away from the adhesive layer 28. As seen in FIG. 1, the metallic felt layer 30 is preferably disposed over a majority, and more preferably over substantially the entire surface area of the second surface 26.

The metal layer 22 can be formed of one or more of various metals and alloys, including aluminum, stainless steel and cold rolled steel. The metal layer 22 preferably yet optionally has a thickness sufficiently small to permit the laminate 20 to be wrapped into a cylindrical structure. The thickness of the metal layer 22 may be, for example, from about 0.005 inch (0.0127 cm) to about 0.060 inch (0.1524 cm), more preferably about 0.010 inch (0.0254 cm) to about 0.030 inch (0.0762 cm). The metallic felt layer 30 may be a thickness of, for example, about 0.125 inch (0.3175 cm) to about 0.50 inch (1.27 cm). The metallic felt layer 30 can be formed of a variety of metallic felts, including, for example, those made of stainless steel, carbon steel and aluminum.

Metallic felts include fibers, and may optionally consist only of fibrous material. The metallic felts selected for embodiments of this invention preferably yet optionally have a mean fiber width of from about 40 microns to about 120 microns. The metallic felt layer 30 also may have a basis weight of from about 400 g/m² to about 1600 g/m². A preferred metallic felt layer 30 is one formed of a metallic felt sold by Global Material Technologies, Inc. under the designation Metal Metrix Textile™.

Metallic felts are widely known. Generally metallic felt is a mat of metal fibers (not unlike steel wool) that has undergone a felting process. The felting process increases the density of the matting with a series of rollers. At the same time, the three-dimensional strength and cohesion of the material is increased by a series of needling devices. These needling devices punch through the thickness of the mat from the top and bottom, pulling fibers with them and causing the fibers to intertwine with one another. The intertwined fibers give the material greater tensile strength in all directions.

The adhesive layer 28 may comprise a polymeric adhesive, for example, a film of an ionomer resin such as Surlyn Ionomer made by E.I. DuPont de Nemours, or a preceramic adhesive, such as one sold under the designation Ceraset SN Inorganic Polymer by Commodore Polymer Technologies, Inc. Such a preceramic adhesive is capable of maintaining a bond between the metallic felt layer 30 and the metal layer 22 at temperatures exceeding 1200° F. (649° C.). The adhesive layer 28 may also include electrically conductive microparticles, such as iron, zinc, nickel, aluminum, combinations thereof, or their alloys, to improve conduction through the adhesive layer 28 to boost weld quality. The micro particles may have a mean diameter of from about 0.0005 inch (0.00127 cm) to about 0.002 inch (0.00508 cm).

Figure 3:
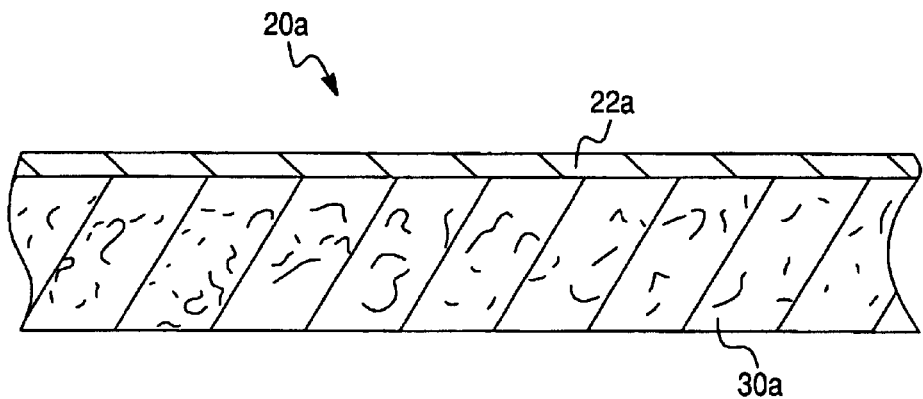
FIG. 3 is a sectional view, similar to FIG. 2, of a laminate according to another embodiment of the present invention.
Figure 4:
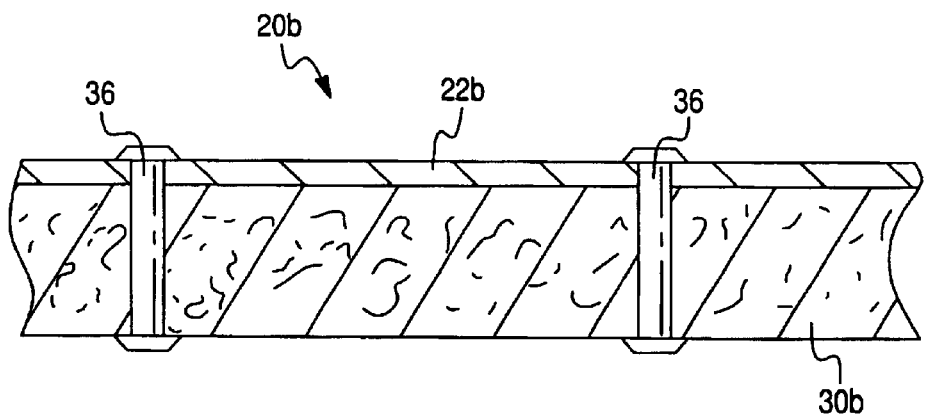
FIG. 4 is a sectional view, similar to FIGS. 2 and 3, of a laminate according to still another embodiment of the present invention.

As shown in FIGS. 3 and 4, laminates 20a and 20b are similar to laminate 20 but without the adhesive layer 28. The laminate 20a includes the metal layer 22a welded to the metallic felt layer 30a. In FIG. 4, laminate 20b includes the metal layer 22b riveted, or otherwise mechanically fastened, to the metallic felt layer 30b by a series of rivets 36 or other suitable fasteners. Alternative, self-fastening systems could be used.

The laminates 20, 20a, 20b serve as effective thermal barriers and can be used in a variety of products, including automotive heat shields, muffler wraps, exhaust pipes, exhaust manifolds, and catalytic converters, and non-automobile parts subject to high temperature applications, such as furnaces. The laminates 20, 20a, 20b can be formed into or placed in proximity to finished parts by conventional sheet forming techniques. The laminates 20, 20a, and 20b preferably yet optionally may also possess and be employed for their vibration and sound damping properties.

The laminates 20, 20a, 20b may be respectively formed by stacking the individual layers and hot pressing the structure, by welding the layers, and by mechanically fastening the layers. For providing larger volumes of laminate, conventional continuous coil-to-coil manufacturing methods may be used. For example, separate rolls of the metal layer and the metallic felt may be uncoiled simultaneously and joined together in a continuous fashion. Joining may be performed via various techniques, such welding (e.g., spot welding or high frequency induction welding), adhesion, or mechanical locking. The finished laminates may be collected and stored in a roll form.

Figure 5:
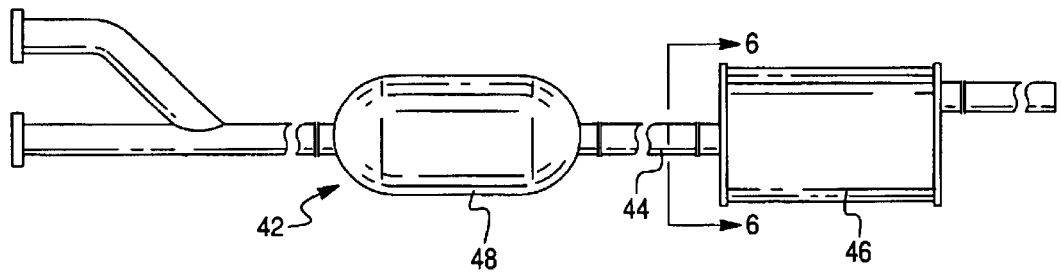
FIG. 5 is a fragmentary top plan view of a motor vehicle exhaust system.
Figure 6:
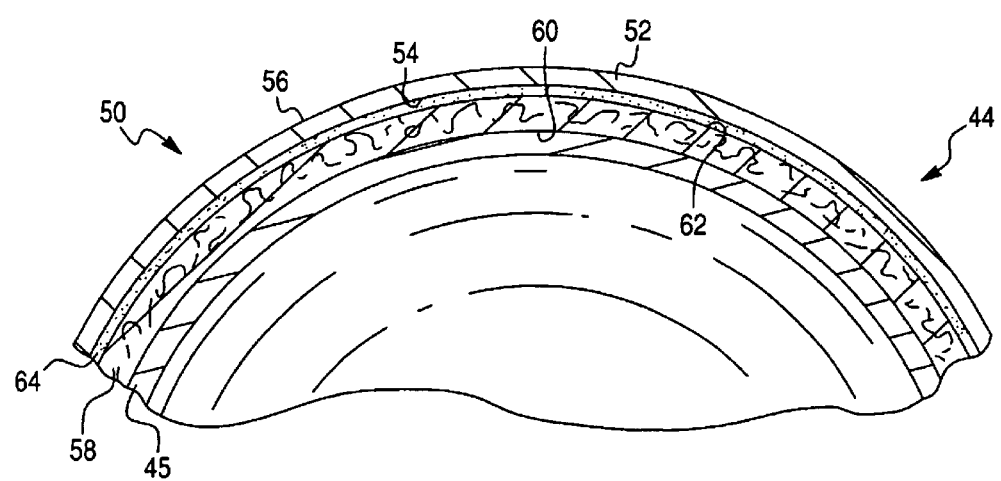
FIG. 6 is an enlarged, fragmentary, sectional view taken generally along line 6—6 of FIG. 5, showing an exhaust pipe surrounded by multi-layer tubing of an embodiment of the present invention.

The laminates can also be used to form tubing and thermal wrap, such as for automotive exhaust systems. Referring to FIG. 5, an automotive exhaust system 42 is illustrated. The automotive exhaust system 42 includes an exhaust pipe 44 connecting a muffler 46 to a catalytic converter 48 in a known manner. Referring to FIG. 6, the exhaust pipe 44 is formed of tubing 45. A laminate 50 surrounds and abuts against the outer surface of the tubing 45. The laminate 50 includes a thermally conductive metal layer 52 having an interior surface 54 and an exterior surface 56, and a substantially thermally non-conductive, fibrous metallic felt layer 58 having an interior surface 60 and an exterior surface 62. The metal layer 52 and the fibrous metallic felt layer 58 may be formed of the same materials and have the same thickness as mentioned above with regard to metal layer 22 and metallic felt layer 30, respectively. In FIG. 6, an adhesive layer 64 is interposed between the exterior surface 62 of the metallic felt layer 58 and the interior surface 54 of the metal layer 52. The adhesive layer 64 can be formed of the same materials as adhesive layer 28 and can include electrically conductive microparticles, as necessary. Optionally, the adhesive layer 64 may be omitted in lieu of or supplemented with, for example, welds, mechanical fasteners, and/or frictional forces between the metal layer 52 and the metallic felt layer 58. The exterior surface 56 of the metal layer 52 can have a corrosion resistant metallic coating, such as a galvanized coating, aluminum or zinc. The dimensions of the laminate 50 may be dictated by the size of exhaust pipe tubing 45. For example, the metal layer 52 may have an outside diameter of from about 1.5 inches (3.81 cm) to about 3.5 inches (8.89 cm). The outside diameter of the fibrous metallic felt layer 58 may be, for example, from about 1.0 inch (2.54 cm) to about 3 inches (7.62 cm). As discussed below, the laminate 50 provides thermal insulation and sound damping properties.

The tubing 45 may be formed in a conventional tube mill, then wrapped with the laminates 50, 20, 20a, or 20b. For example, strips of metal may be fed directly to the tube mill, and rolled into a tube and seam welded shut. The laminate can then be post applied to the tubing 45. According to an embodiment, the basis weight of the laminate felt may be reduced and the attached metal layer may be corrugated at regions adjacent bent portions of the tubing 45, especially the inner radius said of bent portions.

Another embodiment of a tubular laminate 50a of the present invention is illustrated in FIG. 7. The tubular laminate 50a surrounds exhaust pipe tubing 45a, which is substantially identical to the tubing 50 of FIG. 6. It should be understood that the tubular laminate 50a of FIG. 7 and other embodiments of the invention is usable with tubing 45a other than that of an exhaust pipe. The tubular laminate 50a of FIG. 7 comprises a thermally conductive metal layer 52a having an interior surface 54a and an exterior surface 56a, and a substantially thermally non-conductive, fibrous metallic felt layer 58a having an interior surface 60a and an exterior surface 62a. Unlike the laminate 50 of FIG. 6, tubular laminate 50a does not include an optional adhesive layer between the interior surface 54a of the metal layer 52 and the exterior surface 62a of the metallic felt layer 58a. The opposite side edges of the tubular laminate 50a have inner and outer edge portions 66a and 68a, respectively. In the embodiment of FIG. 7, the outer side edge portion 68a overlaps and sits on top of the inner side edge portion 66a at a coupling portion. Weld 70 is formed at the seam adjacent the terminus of the outer side edge portion 68a. The absence of an inner metal layer (such as layer 1024 in FIG. 13A) on the interior surface 60a of the metallic felt layer 58a provides for improved thermal barrier properties. As shown in FIG. 7, the terminal end of the metallic felt layer 58a at inner side edge portion 66a abuts directly against the metallic felt layer 58a, while not contacting the metal layer 52a at the outer side edge portion 68b. The metallic felt layer 58a thereby forms a continuous annular wall around exhaust pipe 45a, uninterrupted by the metal layer 52a. As a consequence, the metal layer 52a neither constitutes nor contributes to the formation of a thermally conductive path between the exhaust pipe 45a and the outside environment at the coupling portion.

Figure 8:
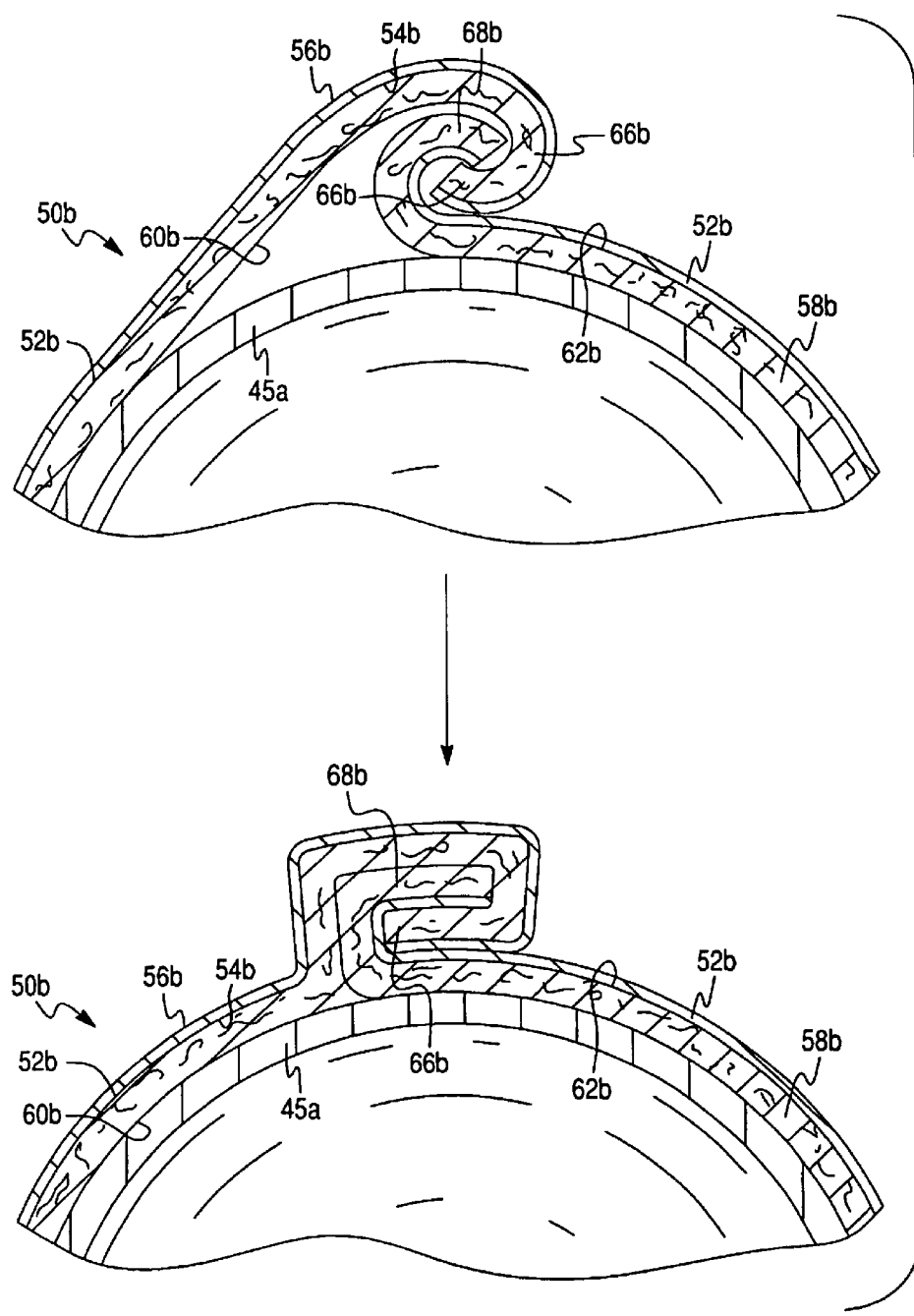
FIGS. 8–10 are enlarged, fragmentary, sectional views, similar to FIG. 6, each showing a respective exhaust pipe surrounded by a multi-layer tubing of the embodiment illustrated in FIG. 3, in which each tubing comprises a respective laminate having overlapping and crimped side edge portions.

FIG. 8 illustrates an embodiment of a tubular laminate 50b, similar to that of FIG. 7, wrapped around exhaust pipe tubing 45b. Unlike the laminate 50a, however, the tubular laminate 50b has an overlapped, crimped coupling portion. FIG. 8 illustrates the tubular laminate 50b in both its pre-crimped state and a subsequent (see arrow) post-crimped state. The tubular laminate 50b comprises a thermally conductive metal layer 52b having interior and exterior surfaces 54b and 56b, and a substantially thermally non-conductive, metallic felt layer 58b having an interior surface 60b and an exterior surface 62b. The opposite side edges of the laminate 50b have first and second edge portions 66b and 68b, respectively. In the embodiment of FIG. 8, the first side edge portion 66b is curled over and into engagement with the second side edge portion 68b at a coupling portion, providing each edge portion 66b and 68b with respective hook-shaped cross sections engaging one another. The edge portions 66b and 68b are then crimped downward to form a seal.

Figure 9:
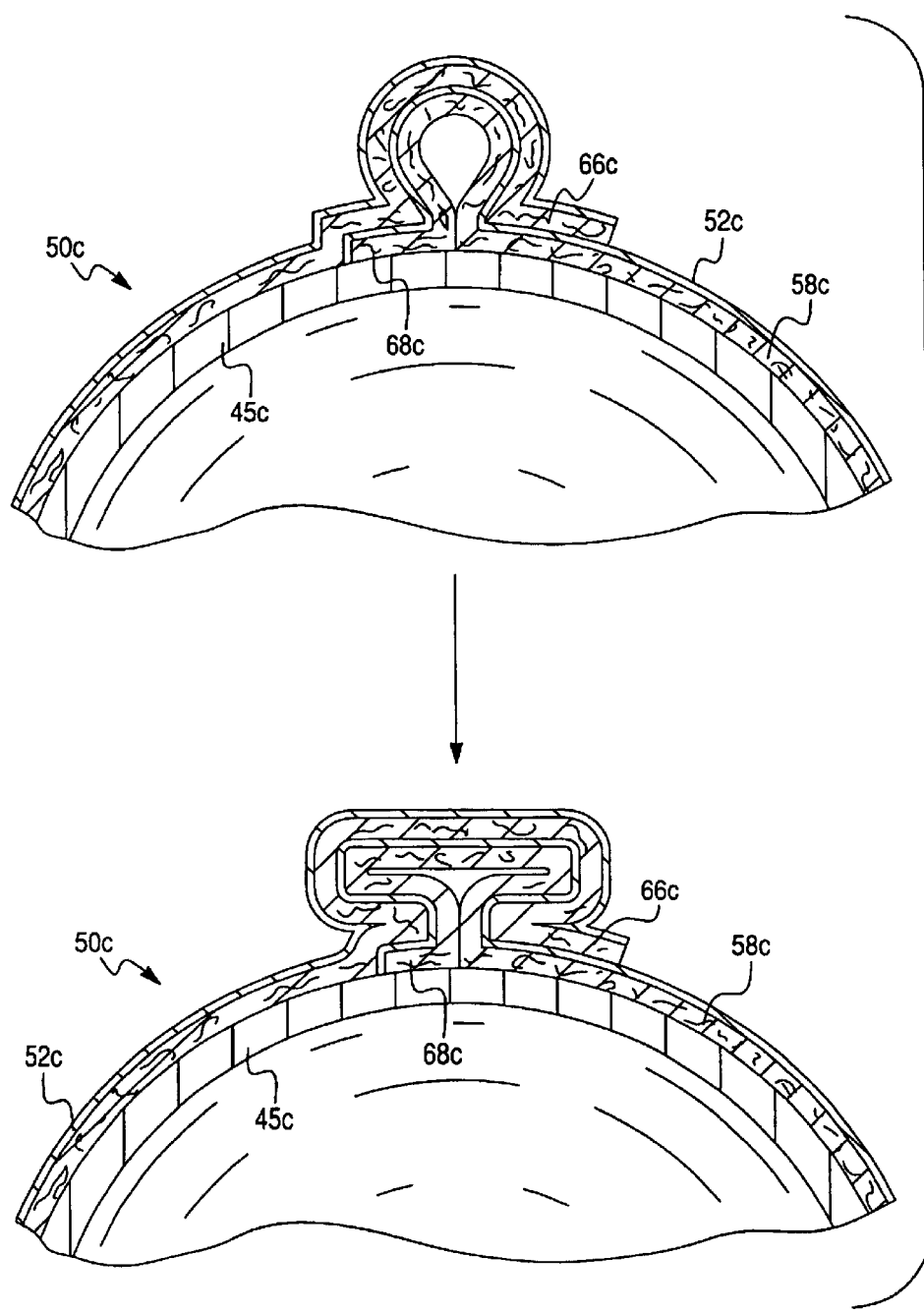
Figure 10:
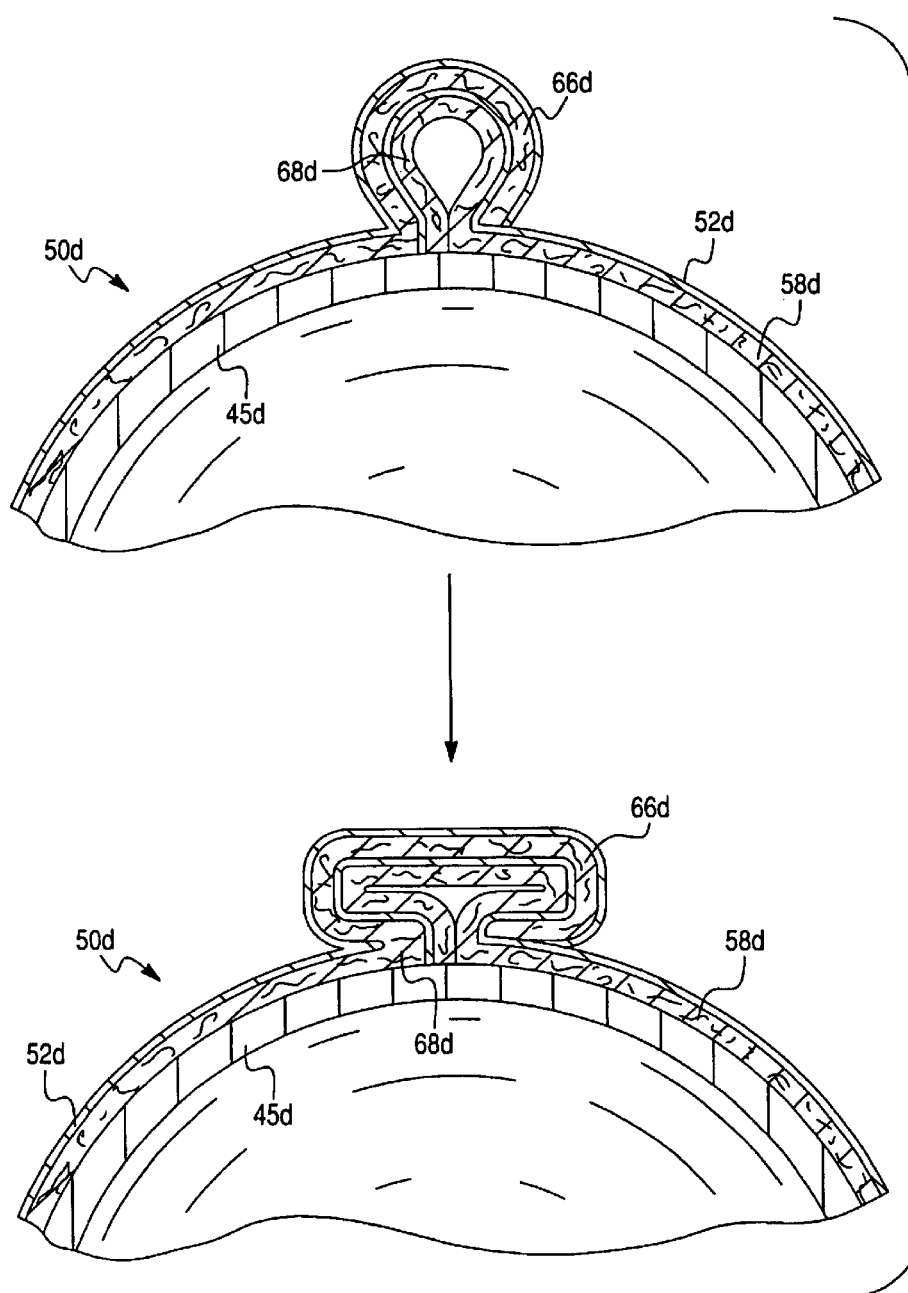

Each of FIGS. 9 and 10 is a cross-sectional illustration of an embodiment of a tubular laminate 50c, 50d wrapped around exhaust pipe tubing 45c, 45d, with the coupling portion illustrated in both a pre-crimped state and a subsequent (see arrow) post-crimped state. The tubular laminate 50c, 50d comprises a thermally conductive metal layer 52c, 52d and a substantially thermally non-conductive, metallic felt layer 58c, 58d inward of the metal layer 52c, 52d. An inner side edge portion 68c, 68d is formed into a bow-like shape, and an opposite outer side edge portion 66c, 66d is abutted in a substantially identical bow-like shape on the outer surface of the inner side edge portion 68c, 68d. The side edge portion 66c, 66d is then crimped with opposite side edge portion 68c, 68d to form a sealed coupling portion. A weld seam (not shown in FIGS. 9 and 10) may optionally be disposed at the terminal end of side edge portion 66b, 66c.

In the embodiments illustrated in FIGS. 8 to 10, the crimped coupling portion is free of a conductive metal path extending therethough. Rather, the metallic felt layer 58b, 58c, 58d forms a continuous non-conductive layer about the exhaust pipe tubing 45b, 45c, 45d, uninterrupted by conductive metal layer 52b, 52c, 52d.

EXAMPLES

The following examples serve to explain and elucidate the principles and practice of the present invention further. These examples are merely illustrative, and not exhaustive as to the scope of the present invention.

All experimental tests were conducted on a two-inch (5.07 cm) outer diameter pipe made of cold rolled steel. The pipe was coupled to a burner mechanism generating a constant flow of hot combustion gases consisting essentially of natural gas and air. A first K-type thermocouple was inserted into the inlet end of the pipe for measuring gas temperature flowing from the burner mechanism into the pipe. On the outer surface of the pipe, second and third K-type thermocouples were spot welded at the axial mid-section of the pipe at a distance of eight inches (20.32 cm) apart from one another. The outer surface of the pipe was wrapped with a laminate in accordance with the following examples or comparative example. The opposite side edges were crimped to one another in the manner illustrated in FIG. 8. Fourth and fifth K-type thermocouples were placed on the outer surface of the wrapped laminate at axial positions eight inches apart corresponding to those of the second and third thermocouples, respectively, to measure the drop in temperature through the laminates.

For each example and comparative example, gas was allowed to flow through the pipe for a start-up period sufficient to achieve a steady gas flow and constant desired temperature. Gas flow rates were measured in cubic feet per minute, and gas temperatures in Celsius, unless otherwise indicated. An adjustment period of about 5 to 10 minutes was permitted before taking measurements each time the flow rate or gas temperature was altered.

Ambient room temperature was maintained in the room in which the tests were conducted throughout all of the testing to ensure consistent convention heat transfer.

Examples 1 and 2

A two-layer laminate was prepared for Examples 1 and 2. The laminate comprised an 800 g/m$^2$ stainless steel felt designated "Metal Metrix Textile"™ from GMT having a thickness of about 0.25 inch (0.635 cm) and an aluminum clad CRS sheet of 0.010 inch (0.0254 cm) thickness. The laminate was wrapped around the exhaust pipe tubing, and crimped as shown in FIG. 8. Example 1 involved the flow of gas through the pipe at a gas flow rate of 100 cubic feet per minute (CFM). The gas was heated between 400° C. and 800° C. (as measured by the first thermocouple), with measurements taken at 100° C. intervals. Temperature readings of the fourth and fifth thermocouples were recorded, and their averages are set forth below in the Table. These procedures were repeated for Example 2, at a gas flow rate of 150 cubic feet per minute. The results of Example 2 are also set forth below in the Table.

Comparative Example A

Figure 11:
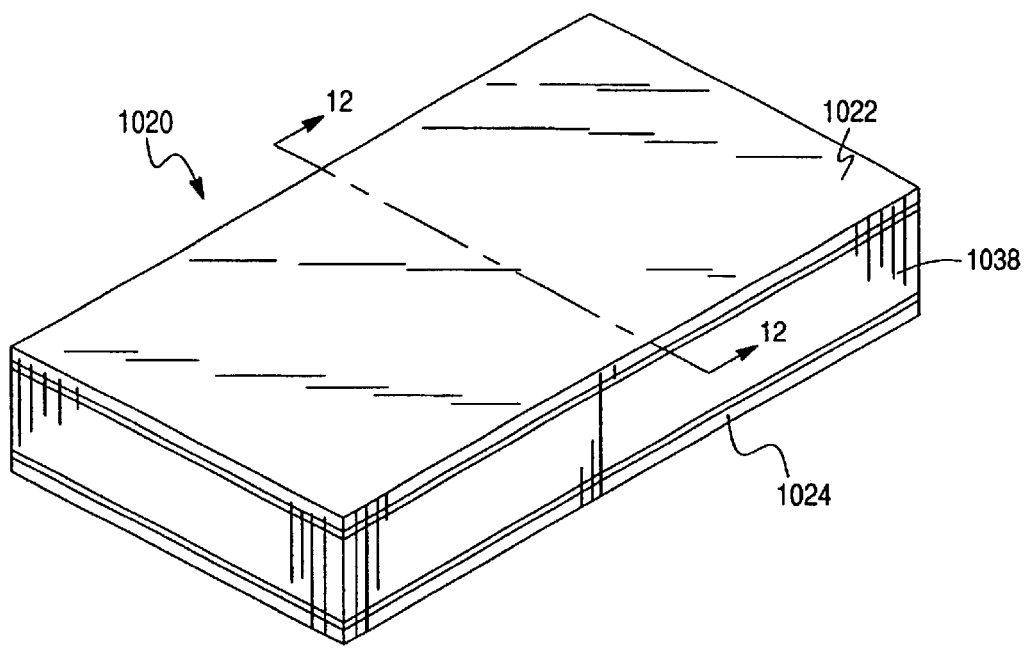
FIG. 11 is a perspective view of a laminate of the Boss patent.
Figure 12:
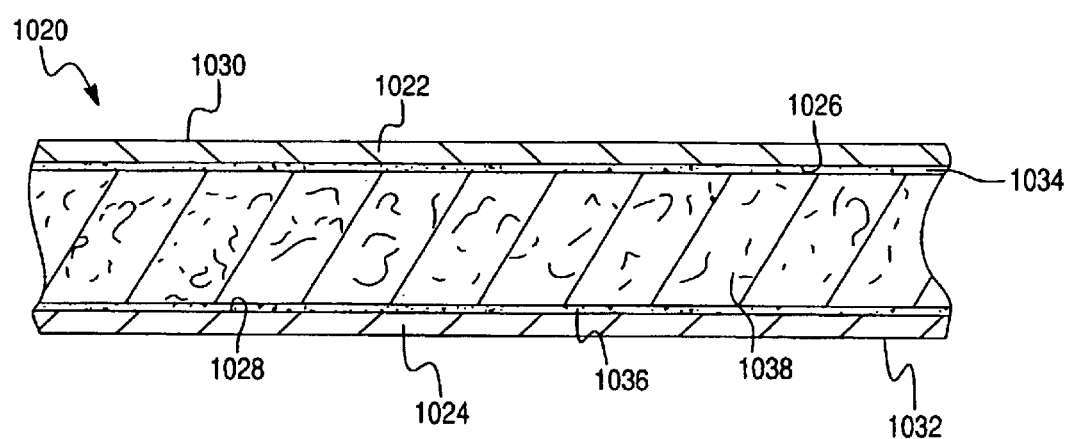
FIG. 12 is an enlarged, fragmentary sectional view taken generally along the line 12—12 of FIG. 11.

For Comparative Example A, a three-layer laminate similar to that of FIGS. 11 and 12 was selected. The comparative three-layer laminate included a second metal layer positioned on an opposite surface of the stainless steel felt from the aluminum first metal layer. The second metal layer consisted of a 300 Series stainless steel layer of 0.015 inch (0.0381 cm) thickness, which was placed adjacent the pipe. The procedures of Example 2, including the use of a gas flow rate of 150 cubic feet per minute, were repeated on Comparative Example A. The average temperature readings of the fourth and fifth thermocouples were recorded, and are reported in the Table below.

|  | 2-layer laminate | | 3-layer laminate |
| --- | --- | --- | --- |
|  | 100 CFM | 150 CFM | 150 CFM |
| 400° C. | 245 | 254 | 273 |
| 500° C. | 298 | 308 | 356 |
| 600° C. | 356 | 386 | 404 |
| 700° C. | 402 | 406 | 469 |
| 800° C. | 465 | 486 | 554 |

Figure 14:
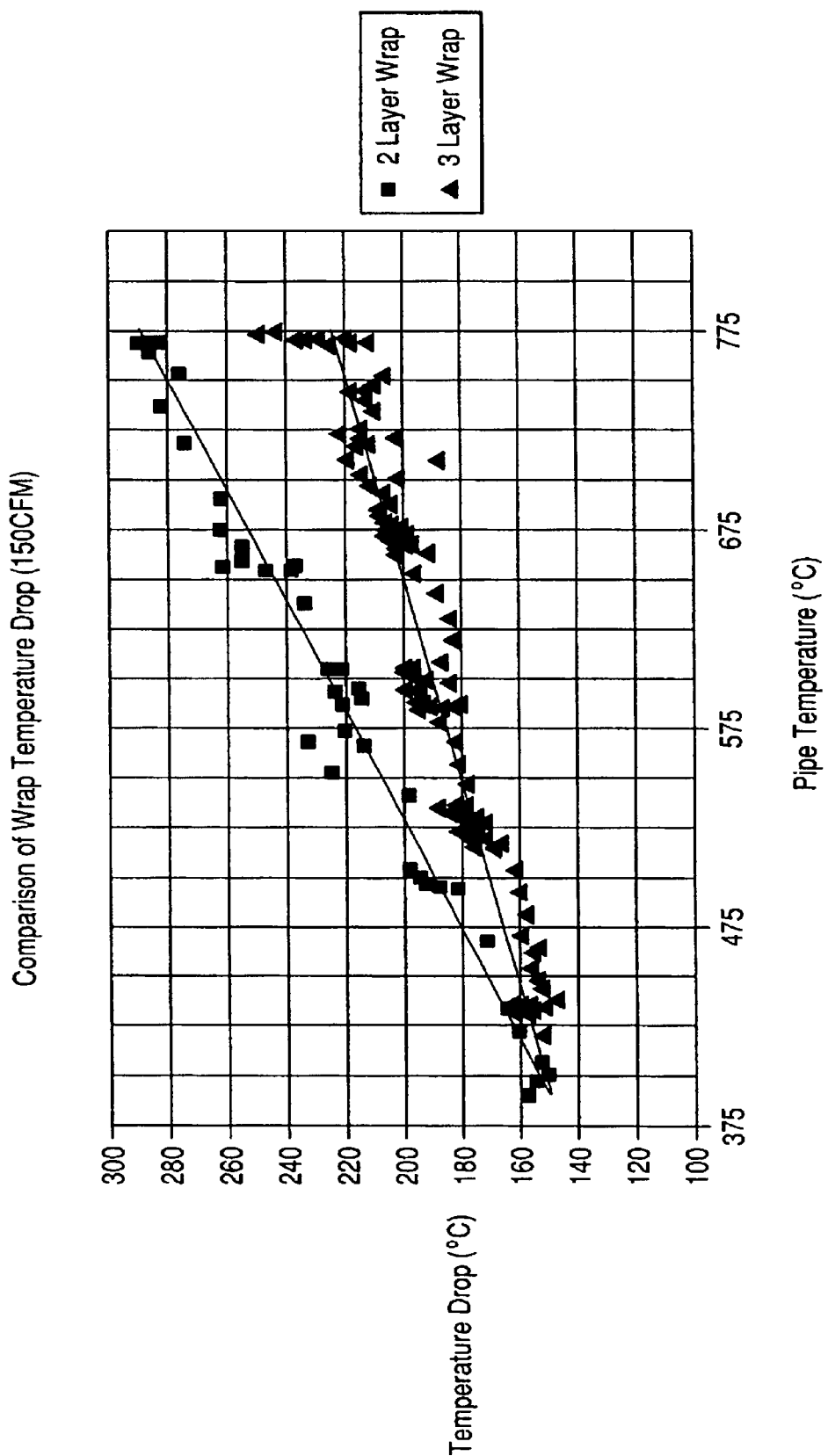
FIG. 14 is a graph illustrating temperature drops attained by a 2-layer wrap laminate of the present invention and a comparative 3-layer wrap laminate.

The temperature drops between the second and the fourth thermocouples were separately calculated for Example 2 and Comparative Example A and recorded in graphical form in FIG. 14. The Table and FIG. 14 demonstrate that the inventive example continuously exhibited improved thermal insulation characteristics over the comparative example. For example, at a pipe temperature of 700° C. the inventive example produced a temperature drop of approximately 260° C., compared to a temperature drop of approximately 210° C. for the comparative example.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A multi-layer tubing, comprising:
   a thermally conductive metal layer having a metallic surface, the metal layer having opposite first and second side edge portions; and
   a substantially thermally non-conductive, metallic felt layer having an outer felt layer surface attached to the metallic surface and an exposed inner felt layer surface, the metallic felt layer having opposite third and fourth side edge portions, the metal layer and the metallic felt layer collectively forming a laminate configured as a substantially cylindrical structure with the metallic felt layer positioned radially inward of the metal layers,
   wherein the first and second side edge portions of the metal layer overlap with and are coupled to one another at a coupling portion, and wherein at least one of the third and fourth side edge portions of the metallic felt layer is interposed between the first and second side edge portions within the coupling portion.

2. A multi-layer tubing according to claim 1, wherein the coupling portion comprises the opposite side edge portions crimped to one another.

3. A multi-layer tubing according to claim 1, wherein the multi-layer tubing is free of a metal wall inward of the metallic felt layer and having overlapping opposite side edge portions coupled at the coupling portion.

4. A multi-layer tubing according to claim 1, wherein the laminate comprises a plurality of layers each configured in a substantially cylindrical structure and coupled at the coupling portion, and wherein the metallic felt layer defines an innermost layer of the laminate.

5. A multi-layer tubing according to claim 1, wherein the metallic felt layer is formed from a fibrous material selected from the group consisting of stainless steel, carbon steel and aluminum.

6. A multi-layer tubing according to claim 1, wherein the metallic felt layer has a basis weight in the range of from about 500 g/m$^2$ to about 1500 g/m$^2$.

7. A multi-layer tubing according to claim 5, wherein the metallic felt layer has a mean fiber width in the range of about 40 microns to about 120 microns.

8. A multi-layer tubing according to claim 1, wherein the metallic felt layer is welded to the metal layer.

9. A multi-layer tubing according to claim 1, wherein the third and fourth side edge portions are coextensive with the first and second side edge portions, respectively.

10. A multi-layer tubing according to claim 1, wherein the first and third side edge portions establish a first hook-shaped section, wherein the second and fourth side edge portions establish a second hook-shaped section, and wherein the coupling portion comprises the first and second hook-shaped sections inter-engaged with one another.

11. A multi-layer tubing according to claim 1, wherein the coupling portion comprises a crimpable bow-shape section in which the first and third side edge portions are engaged with the second and fourth side edge portions.

12. A multi-layer tubing, comprising:
    a thermally conductive metal layer having a metallic surface, the metal layer having opposite first and second side edge portions; and
    a substantially thermally non-conductive, metallic felt layer having an outer felt layer surface attached to the metallic surface and an inner felt layer surface, the metallic felt layer having opposite third and fourth side edge portions, the metal layer and the metallic felt layer collectively forming a laminate configured as a substantially cylindrical structure with the metallic felt layer positioned radially inward of the metal layer,
    wherein the first and second side edge portions of the metal layer overlay with and are coupled to one another at a coupling portion, and wherein at least one of the third and fourth side edge portions of the metallic felt layer is interposed between the first and second side edge portions within the coupling portion.
    wherein the laminate is free of a thermally conductive path through the coupling portion.

13. A multi-layer tubing according to claim 12, wherein the metallic felt layer prevents the thermally conductive path from extending through the coupling portion.

14. A multi-layer tubing according to claim 12, wherein the coupling portion comprises the opposite side edge portions crimped to one another.

15. A multi-layer tubing according to claim 12, wherein the multi-layer tubing is free of a metal wall inward of the metallic felt layer and having overlapping opposite side edge portions coupled at the coupling portion.

16. A multi-layer tubing according to claim 12, wherein the laminate comprises a plurality of layers each configured in a substantially cylindrical structure and coupled at the coupling portion, and wherein the metallic felt layer defines an innermost layer of the laminate.

17. A multi-layer tubing according to claim 12, wherein the metallic felt layer is formed from a fibrous material selected from the group consisting of stainless steel, carbon steel and aluminum.

18. A multi-layer tubing according to claim 12, wherein the metallic felt layer has a basis weight in the range of from about 500 g/m$^2$ to about 1500 g/m$^2$.

19. A multi-layer tubing according to claim 18, wherein the metallic felt layer has a mean fiber width in the range of about 40 microns to about 120 microns.

20. A multi-layer tubing according to claim 12, wherein the metallic felt layer is welded to the metal layer.

21. A multi-layer tubing according to claim 12, wherein the third and fourth side edge portions are coextensive with the first and second side edge portions, respectively.

22. A multi-layer tubing according to claim 12, wherein the first and third side edge portions establish a first hook-shaped section, wherein the second and fourth side edge portions establish a second hook-shaped section, and wherein the coupling portion comprises the first and second hook-shaped sections inter-engaged with one another.

23. A multi-layer tubing according to claim 12, wherein the coupling portion comprises a crimpable bow-shape section in which the first and third side edge portions are engaged with the second and fourth side edge portions.

24. A thermally insulated assembly, comprising:
a thermally conductive structure; and
a multi-layer tubing comprising a thermally conductive metal layer and a substantially thermally non-conductive, metallic felt layer, the metal layer having opposite first and second side edges, the metallic felt layer having inner and outer felt layer surfaces extending between third and fourth side edges, the inner felt layer surface surrounding the thermally conducting structure, the outer felt layer surface surrounded by and attached to an inner surface of the metal layer, the metal layer and the metallic felt layer collectively forming a laminate as a substantially cylindrical structure with the metallic felt layer positioned radially between the metal layer and the thermally conductive structure,
wherein the first and second side edges of the metal layer overlap with and are coupled to one another at a coupling portion, and wherein at least one of the third and fourth side edge portions of the metallic felt layer is interposed between the first and second side edge portions within the coupling portion.

25. A thermally insulated assembly according to claim 24, wherein the laminate is free of a thermally conductive path through the coupling portion.

26. A thermally insulated assembly according to claim 24, wherein the metallic felt layer physically separates and prevents direct thermal communication between the thermally conductive structure and the metal layer.

27. A thermally insulated assembly according to claim 24, wherein the thermally conductive structure is tubular and has a central passageway for the passage of fluid.

28. A thermally insulated assembly according to claim 27, wherein the thermally conductive structure comprises an automotive exhaust pipe.

29. A thermally insulated assembly according to claim 24, wherein the thermally conductive structure is free of side edge portions overlapping with and coupled to the multi-layer tubing at the coupling portion.

30. A thermally insulated assembly according to claim 24, wherein the coupling portion is crimped.

31. A thermally insulated assembly according to claim 24, wherein the metallic felt layer is formed from a metallic material selected from the group consisting of stainless steel, carbon steel and aluminum.

32. A thermally insulated assembly according to claim 24, wherein the metallic felt layer has a basis weight in the range of from about 500 g/m$^2$ to about 1500 g/m$^2$.

33. A thermally insulated assembly according to claim 32, wherein the metallic felt layer has a mean fiber width in the range of about 40 microns to about 120 microns.

34. A thermally insulated assembly according to claim 24, wherein the metallic felt layer is welded to the metal layer.

35. A thermally insulated assembly according to claim 24, wherein the third and fourth side edge portions are coextensive with the first and second side edge portions, respectively.

36. A thermally insulated assembly according to claim 24, wherein the first and third side edge portions establish a first hook-shaped section, wherein the second and fourth side edge portions establish a second hook-shaped section, and wherein the coupling portion comprises the first and second hook-shaped sections inter-engaged with one another.

37. A thermally insulated assembly according to claim 24, wherein the coupling portion comprises a crimpable bow-shape section in which the first and third side edge portions are engaged with the second and fourth side edge portions.

38. A method for thermally insulating a thermally conductive structure, comprising:
providing a laminate comprising a thermally conductive metal layer and a substantially thermally non-conductive, metallic felt layer, the metal layer having opposite first and second side edge portions, the metallic felt layer having an outer felt layer surface and an exposed inner felt layer surface extending between opposite third and fourth side edge portions, the outer felt layer surface attached to the metal layer;
arranging the laminate around a thermally conductive structure to configure the laminate as a substantially cylindrical structure with the metallic felt layer positioned radially between the metal layer and the thermally conductive structure; and
overlapping and coupling the first and second side edge portions to one another at a coupling portion, with at least one of the third and fourth side edge portions interposed between the first and second side edge portions within the coupling portion.

39. A method according to claim 38, wherein the laminate is free of a thermally conductive path through the coupling portion.

40. A method according to claim 38, where in the metallic felt layer physically separates and prevents direct thermal communication between the thermally conductive structure and the metal layer.

41. A method according to claim 38, wherein the thermally conductive structure is tubular and has a central passageway for the passage of fluid.

42. A method according to claim 41, wherein the thermally conductive structure comprises an automotive exhaust pipe.

43. A method according to claim 38, wherein the thermally conductive structure is free of side edge portions overlapping with and coupled to the substantially cylindrical structure at the coupling portion.

44. A method according to claim 38, wherein the coupling portion is crimped.

45. A method according to claim 38, wherein the metallic felt layer is formed from a metallic material selected from the group consisting of stainless steel, carbon steel and aluminum.

46. A method according to claim 38, wherein the metallic felt layer has a basis weight in the range of from about 500 g/m$^2$ to about 1500 g/m$^2$.

47. A method according to claim 45, wherein the metallic felt layer has a mean fiber width in the range of about 40 microns to about 120 microns.

48. A method according to claim 38, wherein the metallic felt layer is welded to the metal layer.

49. A method according to claim 38, wherein the third and fourth side edge portions are coextensive with the first and second side edge portions, respectively.

50. A method according to claim 38, wherein the first and third side edge portions establish a first hook-shaped section, wherein the second and fourth side edge portions establish a second hook-shaped section, and wherein the coupling portion comprises the first and second hook-shaped sections inter-engaged with one another.

51. A method according to claim 38, wherein the coupling portion comprises a crimpable bow-shape section in which the first and third side edge portions are engaged with the second and fourth side edge portions.

* * * * *